(12) United States Patent
Mantin

(10) Patent No.: US 6,822,943 B1
(45) Date of Patent: *Nov. 23, 2004

(54) NETWORK ACCESS MULTIPLEXER WITH PROTOCOL ADDRESS TRANSLATION

(75) Inventor: Sharon Mantin, Tel Aviv (IL)

(73) Assignee: Orckit Communications Ltd., Tel Aviv (IL)

( * ) Notice: Subject to any disclaimer, the term of this patent is extended or adjusted under 35 U.S.C. 154(b) by 780 days.

This patent is subject to a terminal disclaimer.

(21) Appl. No.: 09/708,841

(22) Filed: Nov. 8, 2000

(51) Int. Cl.⁷ .............................................. H04L 12/28
(52) U.S. Cl. .................. 370/254; 370/395.52; 709/221
(58) Field of Search ......................... 370/395.1, 395.5, 370/395.52, 465, 475, 352–356, 401, 254, 351, 463; 709/220, 221, 222; 375/222

(56) References Cited

U.S. PATENT DOCUMENTS

| | | | |
|---|---|---|---|
| 5,889,470 A | | 3/1999 | Kaycee et al. |
| 6,058,445 A | | 5/2000 | Chari et al. |
| 6,085,245 A | | 7/2000 | Kaycee et al. |
| 6,310,862 B1 | * | 10/2001 | Roy ........................... 370/260 |
| 6,339,594 B1 | * | 1/2002 | Civanlar et al. ............ 370/352 |
| 6,404,861 B1 | | 6/2002 | Cohen et al. |
| 6,434,221 B1 | | 8/2002 | Chong |
| 6,469,630 B1 | | 10/2002 | Jeske |
| 6,512,739 B1 | | 1/2003 | Heidari |
| 6,522,688 B1 | | 2/2003 | Dowling |
| 6,580,727 B1 | | 6/2003 | Yim et al. |
| 6,597,689 B1 | * | 7/2003 | Chiu et al. ................... 370/354 |
| 6,628,649 B1 | * | 9/2003 | Raj et al. ..................... 370/360 |
| 6,636,505 B1 | | 10/2003 | Wang et al. |
| 6,680,904 B1 | * | 1/2004 | Kaplan et al. ............... 370/217 |

OTHER PUBLICATIONS

IETC RFC 2225, Apr. 1998, pp. 1–22.
IETC RFC 2631, Jun. 1999, pp. 1–11.
IETC RFC 1901, Jan. 1996, pp. 1–7.
IETC RFC 1694, Feb. 1999, pp. 1–67.

* cited by examiner

Primary Examiner—Ajit Patel
(74) Attorney, Agent, or Firm—Darby & Darby

(57) ABSTRACT

Communication access apparatus includes a master shelf, including a master switching unit linked to communicate with a high-speed network, and a plurality of slave shelves arranged in a given system topology with respect to the master shelf. Each of the slave shelves includes ports configured to serve network subscribers, and further includes a slave switching unit, coupled to communicate with the master switching unit and to multiplex among the ports so as to provide the subscribers with access to the high-speed network, and to receive from the master shelf management messages that are addressed to an internal network-layer address that is determined uniquely for each of the slave shelves based on the topology. A management station is coupled to convey the management messages to the master shelf over a management network in which at least some of the slave shelves share a common external network-layer address by mapping the internal network-layer address of each of the shelves to a respective transport-layer address.

31 Claims, 2 Drawing Sheets

NETWORK ACCESS MULTIPLEXER WITH PROTOCOL ADDRESS TRANSLATION

CROSS-REFERENCE TO RELATED APPLICATION

This application is related to co-pending U.S. patent application Ser. No. 09/708,845.

FIELD OF THE INVENTION

The present invention relates generally to high-speed data communication systems, and specifically to Digital Subscriber Line systems.

BACKGROUND OF THE INVENTION

Digital Subscriber Line (DSL) is a modem technology that enables broadband digital data to be transmitted over twisted-pair wire, which is the type of infrastructure that links most home and small business subscribers to their telephone service providers. DSL modems enable users to access digital networks at speeds tens to hundreds of times faster than current analog modems and basic ISDN service. DSL thus opens the Most critical bottleneck in local-loop access to high-speed networks, such as Asynchronous Transfer Mode (ATM) and Internet Protocol (IP) networks, without requiring major investments in new infrastructure. A range of DSL standards have been defined, known generically as "xDSL," wherein the various standards have different data rates and other associated features but share common principles of operation.

DSL subscribers are connected to high-speed networks through Digital Subscriber Line Access Multiplexer (DSLAM) systems. Because of the high cost of network bandwidth, a single DSLAM must typically be designed to serve between 100 and 1000 subscribers and to concentrate their traffic through one or a few high-speed network trunks. The need to serve such a large and potentially variable number of subscribers in the one DSLAM has led to the development of "multi-shelf" access architectures. In the physical implementation of such systems, each of the shelves holds a switching unit and a group of line cards. Each line card has a number of ports that serve network subscribers. Each switching unit links the shelf to the network trunk (either directly or through the switching unit of another shelf) and multiplexes the network connection among the line cards.

In order to reduce maintenance costs, DSLAM systems are typically configured so that, insofar as possible, management and maintenance activities are carried out using a remote management station. The object of this configuration is to minimize the number of service calls that a maintenance engineer or technician must make to the site of the DSLAM. Typically, the management station communicates "in-band" with the switching units, i.e., via the high-speed network. Alternatively, the management station may communicate with the master unit via an "out-of-band" network, such as an Ethernet network, or by a point-to-point (PPP) dial-up connection.

In some configurations, the remote management station communicates with the elements of the DSLAM using IP addressing and messages over a public network. With the explosive growth of the Internet, however, IP addresses are becoming scarce. The Internet Engineering Task Force (IETF) has proposed methods of Network Address Translation (NAT) for reducing the number of IP addresses used in public networks. These methods are described in detail in IETF Request for Comments (RFC) 2631, which is incorporated herein by reference and is available at www.rfc-editor.org/rfcsearch.html.

SUMMARY OF THE INVENTION

It is an object of some aspects of the present invention to provide an improved management network for a high-speed network access multiplexing system, and particularly for a multi-shelf access system.

It is another object of some aspects of the present invention to provide an Internet Protocol (IP) management network for a multi-shelf access system that uses a minimal number of IP addresses.

In preferred embodiments of the present invention, a network access multiplexing system comprises multiple shelves, each shelf comprising a switching unit, linked to the network, and one or more line cards, having ports that serve respective network subscribers. The shelves comprise a master shelf, having a master switching unit connected to the network, and a plurality of slave shelves, having slave switching units linked to the network through the master switching unit. The master shelf serves as a gateway for an IP-based management network, through which a remote management station communicates with the master and slave shelves to perform configuration and maintenance functions.

The management station communicates with the shelves using a transport-layer protocol, such as the User Datagram Protocol (UDP), with a different session-layer port, such as a UDP port, assigned to each of the shelves. In other words, the UDP port is used as a hardware address, rather than as a session-layer port for a given presentation-layer protocol as is known in the art, so that only one network-layer (IP) address per trunk connection to the master shelf is required in order for the management network to address all of the shelves in the multiplexing system. Internally, the master shelf maps the UDP ports to local network-layer addresses, preferably IP addresses, of the slave shelves. The mapping is carried out automatically, based on the topology of the multi-shelf system. Thus, the master shelf determine al of the UDP ports and corresponding internal IP addresses autonomously, without the need for programming of Network Address Translation (NAT) data as in systems known in the art. The slave shelves similarly determine their own internal IP addresses.

There is therefore provided, in accordance with a preferred embodiment of the present invention, communication access apparatus, including:

a master shelf, including a master switching unit linked to communicate with a high-speed network;

a plurality of slave shelves arranged in a given system topology with respect to the master shelf, each of the slave shelves including ports configured to serve network subscribers, and further including a slave switching unit, coupled to communicate with the master switching unit and to multiplex among the ports so as to provide the subscribers with access to the high-speed network, and to receive from the master shelf management messages that are addressed to an internal network-layer address that is determined uniquely for each of the slave shelves based on the topology; and a management station, coupled to convey the management messages to the master shelf over a management network in which at least some of the slave shelves share a common external network-layer address by mapping the internal network-layer address of each of the shelves to a respective transport-layer address.

In a preferred embodiment, the master shelf and the plurality of slave shelves belong to a Digital Subscriber Line Access Multiplexing (DSLTM) system. Preferably, the high-speed network includes an Asynchronous Transfer Mode (ATM) network, wherein the master and slave switching units communicate over ATM lines. Further preferably, the management network includes an Internet Protocol (IP) network, which is operative over the ATM lines using an IP over ATM protocol. Most preferably, the external network-layer address includes a single IP address that is common to the master shelf and to all of the slave shelves.

Additionally or alternatively, the respective transport-layer address to which the management station maps the internal network-layer address includes a session-layer port. Preferably, the session-layer port includes a User Datagram Protocol (UDP) port. Further preferably, the management station is adapted to map each internal network-layer address of each of the shelves to multiple different session-layer ports, depending on a presentation-layer protocol used in the management messages. Most preferably, the internal network-layer address includes an internal IP address, and the master switching unit is adapted to map the session-layer port in the management messages to the internal IP address.

Preferably, the master switching unit is adapted to analyze the system topology and to assign the internal network-layer address of each of the slave shelves automatically responsive to the analyzed topology. Most preferably, the master switching unit is further adapted to determine the mapping of the internal network-layer address of each of the shelves to the respective transport-layer address automatically responsive to the analyzed topology. Additionally or alternatively each of the slave shelves is adapted to determine its respective position in the topology and to recognize its internal network-layer address responsive to its determined position. In a preferred embodiment, the topology includes a plurality of daisy chains, over which the slave switching units are coupled to communicate with the master switching unit, and the internal network-layer address of each of the slave shelves is determined uniquely by an identifying number of the chain in which the shelf is located and a position of the shelf in the chain.

There is also provided, in accordance with a preferred embodiment of the present invention, a method for providing communication access, including:

linking a master switching unit on a master shelf to communicate with a high-speed network;

arranging a plurality of slave shelves in a given system topology with respect to the master shelf, so that a slave switching unit on each slave shelf communicates with the master switching unit and multiplexes among subscriber ports on the slave shelf so as to provide the subscribers with access to the high-speed network;

assigning to each slave shelf a unique internal network-layer address based on the topology, for receiving management instructions from the master switching unit;

conveying the management instructions from a management station to the master shelf over a management network in which at least some of the slave shelves share a common external network-layer address, by mapping the internal network-layer address of each of the shelves to a respective transport-layer address.

The present invention will be more fully understood from the following detailed description of the preferred embodiments thereof, taken together with the drawings in which:

DETAILED DESCRIPTION OF PREFERRED EMBODIMENTS

Figure 1:
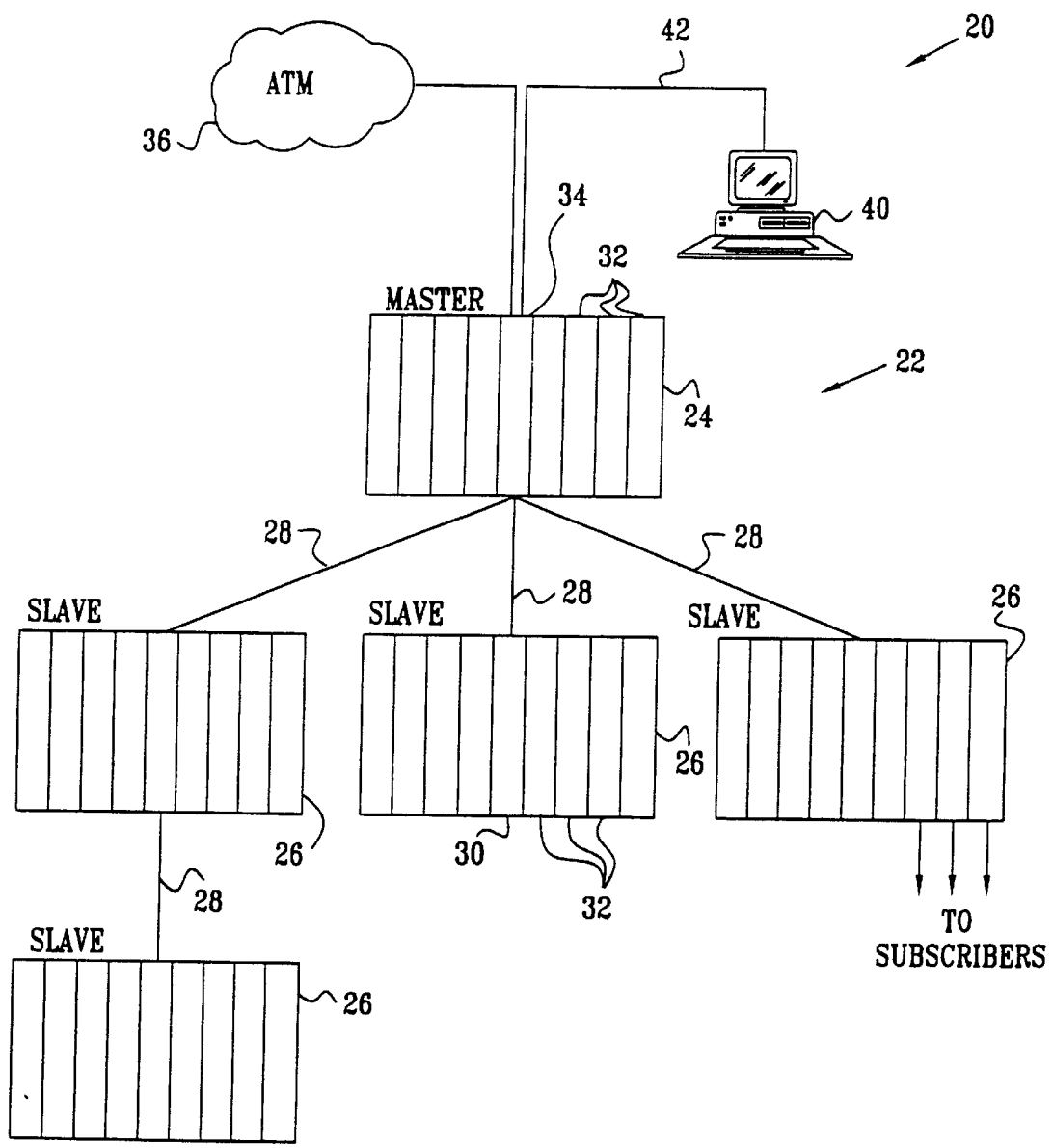
FIG. 1 is a block diagram that schematically illustrates a multi-shelf network access multiplexing system, in accordance with a preferred embodiment of the present invention.

FIG. 1 is a block diagram that schematically illustrates a multi-shelf network access multiplexing system 20, in accordance with a preferred embodiment of the present invention. System 20 is built around a DSLAM 22, which comprises a master shelf 24 coupled to multiple slave shelves 26, which are preferably arranged in a hybrid star/chain configuration. Most preferably, slave shelves 26 are arranged in multiple daisy chains, as described in co-pending U.S. patent application Ser. No. 09/472,683, entitled "Bi-Directional Chaining of Network Access Ports," which is assigned to the assignee of the present patent application, and whose disclosure is incorporated herein by reference. For simplicity of illustration, however, FIG. 1 shows only a part of the more complex topology described in the co-pending application.

Master shelf 24 comprises a master switching unit 34 (referred to hereinafter as a master unit), which communicates with a core high-speed network 36, such as an Asynchronous Transfer Mode (ATM) network. The master unit comprises switching equipment that multiplexes the network connection among the multiple slave shelves 26. Typically, the master shelf also includes line cards 32 connected to master unit 34, each line card comprising ports that serve network subscribers. Each of slave shelves 26 comprises its own line cards 32 and a slave switching unit 30 (or slave unit) for multiplexing among them. Communications between master unit 34 and slave units 30 are carried over ATM lines 28. Preferably, each slave shelf has its own hard-coded virtual channel connection (VCC) for this purpose.

Management and maintenance of system 20 are preferably carried out remotely, using a management station 40, which typically comprises a personal computer or workstation. Management station 40 communicates with master unit 34 via an "out-of-band" link 42, such as an Ethernet link, typically connected to a public Internet Protocol (IP) network. The management functions of station 40 are implemented over a private, internal IP network defined within DSLAM 22, preferably using the Simple Network Management Protocol (SNMP), as is known in the art. Further information regarding SNMP is provided by IETF RFC 1901, which is incorporated herein by reference and is available at www.rfc-editor.org/rfcsearch.html.

For the purpose of the internal IP network within DSLAM 22, each of shelves 24 and 26 is defined as a separate network element, with its own internal IP address. As illustrated in detail hereinbelow, the internal IP addresses are assigned uniquely based on the topology of slave shelves 26 in relation to master shelf 24. Management communications between master shelf 24 and slave shelves 26 are conducted by means of IP over ATM (IPOA), as described in IETF RFC 2225, which is likewise incorporated herein by reference and is available at www.rfc-editor.org/rfcsearch.html. Details of the functioning of the management network in system 20 are further described in a U.S. patent application entitled, "Management Interface for a Network Access Multiplexing System," filed on even date, which is assigned to the assignee of the present patent application and is incorporated herein by reference.

Although internally each slave shelf 26 has if's own IP address, these IP addresses are mapped to UDP, ports for the purpose of communications with management station 40. The mapping is carried out automatically by master shelf 24, based on the topology of the slave shelves in DSLAM 22. As a result, the management station can communicate over link 42 with all of the shelves using only one IP address per Synchronous Transfer Mode 1 (STM-1) trunk connection to DSLAM 22. A typical mapping of this sort is presented below in Table I:

TABLE I

UDP/IP SHELF MAPPING

| Chain | Shelf | Protocol | NETWORK IP address | NETWORK UDP port | DSLAM IP address | DSLAM UDP port |
|---|---|---|---|---|---|---|
|   | Master | SNMP | 137.205.159.35 | 10011 | 10.10.1.1 | 161 |
|   | Master | TFTP | " | 10012 | 10.10.1.1 | 69 |
|   | Master | Telnet | " | 10013 | 10.10.1.1 | 23 |
| 1 | 1 | SNMP | " | 10021 | 10.10.1.2 | 161 |
| 1 | 1 | TFTP | " | 10022 | 10.10.1.2 | 69 |
| 1 | 1 | Telnet | " | 10023 | 10.10.1.2 | 23 |
| 1 | 2 | SNMP | " | 10061 | 10.10.1.6 | 161 |
| 1 | 2 | TFTP | " | 10062 | 10.10.1.6 | 69 |
| 1 | 2 | Telnet | " | 10063 | 10.10.1.6 | 23 |
| 2 | 1 | SNMP | " | 10031 | 10.10.1.3 | 161 |
| 2 | 1 | TFTP | " | 10032 | 10.10.1.3 | 69 |
| 2 | 1 | Telnet | " | 10033 | 10.10.1.3 | 23 |
| 2 | 2 | SNMP | " | 10071 | 10.10.1.7 | 161 |
| 2 | 2 | TFTP | " | 10072 | 10.10.1.7 | 69 |
| 2 | 2 | Telnet | " | 10073 | 10.10.1.7 | 23 |
| 3 | 1 | SNMP | " | 10041 | 10.10.1.4 | 161 |
| 3 | 1 | TFTP | " | 10042 | 10.10.1.4 | 69 |
| 3 | 1 | Telnet | " | 10043 | 10.10.1.4 | 23 |
| 3 | 2 | SNMP | " | 10081 | 10.10.1.8 | 161 |
| 3 | 2 | TFTP | " | 10082 | 10.10.1.8 | 69 |
| 3 | 2 | Telnet | " | 10083 | 10.10.1.8 | 23 |

Table I relates to an exemplary configuration. in which slave shelves 26 are arranged in three chains, with two shelves in each chain. Possible variations on this configuration and on the assignment of UDP ports and IP addresses to the different shelves will be apparent to those skilled in the art. Management station 40 can communicate with the master and slave shelves using various different presentation-layer protocols, including SNMP, Trivial File Transfer Protocol (TFTP) and Telnet, for example. Vis a vis the management station, all of the shelves have the same IP address (arbitrarily, 137.205.159.35) on the external network to which link 42 belongs. There are three unique UDP ports assigned to each of the shelves, one for each of the available protocols. These are preferably the standard, session-layer UDP ports that are associated with the respective presentation-layer protocols. Other protocols and ports may also be added.

Within DSLAM 22, however, master shelf 24 maps each of the UDP ports to a unique internal IP address for each shelf and a protocol-specific UDP port. The internal IP address in this example is 10.10.1.X, wherein for each of the slave shelves, X=(Chain number)+4* (Shelf number)−3. The same value of X is used as the fourth digit of the network UDP port for each slave shelf. The master and slave units are preferably pre-programmed with this formula before installation.

Figure 2:
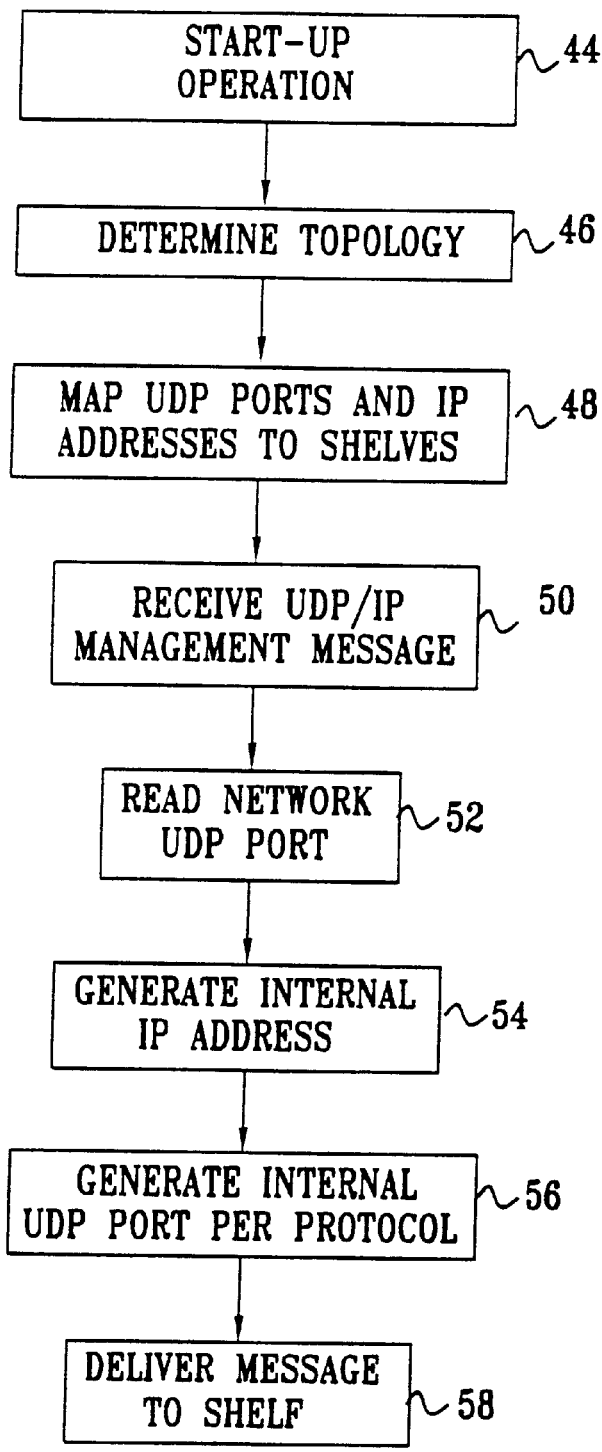
FIG. 2 is a flow chart that schematically illustrates a method of network address translation for use in a multi-shelf network access multiplexing system, in accordance with a preferred embodiment of the present invention.

FIG. 2 is a flow chart that schematically illustrates a method for routing management messages sent by management station 40 to a designated shelf within DSLAM 22, in accordance with a preferred embodiment of the present invention. The method begins whenever system 20 is started up, at an initiation step 44. Master unit 34 is programmed to determine the positions of all of slave units 30, i.e., the chain numbers and shelf numbers all of the slave shelves in the DSLAM, at a topology mapping step 46. The appropriate chain number is preferably programmed into each slave unit upon installation, while the shelf numbers are determined automatically based on the position of each shelf in its respective chain. The master unit uses this topology information to determine the internal IP addresses of the slave units and to map these IP addresses to the appropriate external UDP ports, at a mapping step 48. Preferably, the slave units similarly determine their own internal IP addresses based on their own chain numbers and positions.

The mapping generated at step 48 is used in all subsequent communications between management station 40 and the shelves of DSLAM 22. When the management station needs to send a message to one of slave shelves 26, it uses the appropriate network UDP port, as shown in Table I, depending on the identity of the shelf and the protocol that is to be used in the message. For example, a SNMP message to slave shelf 2 in chain 1 will receive UDP port 10061. The management station then sends the message as a UDP/IP packet to the network IP address of DSLAM 22.

Master shelf 24 receives the UDP/IP message packet from the management station, at a message reception step 50. It reads the UDP port in the packet, at a UDP reading step 52, and looks up the port in Table I. The Table gives the internal IP address of the intended slave shelf, at an IP address generation step 54, and the appropriate internal UDP port, at a UDP port generation step 56. In this case, the internal IP address is 10.10.1.6, and the UDP port is 161. Based on this information, master shelf generates an internal UDP/IP message packet and delivers it to the appropriate slave shelf 26, at a message delivery step 58.

While the preferred embodiment described hereinabove relates specifically to DSLAM 22 and to communication protocols based on UDP/IP, the principles of the present invention are likewise applicable to management of other types of multi-shelf access systems and to other communication protocols. The methods of the present invention may thus be implemented in other multi-shelf systems, so as to conserve network-layer addresses (such as IP addresses) by using transport- and session-layer resources (such as UDP ports) instead.

It will therefore be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. Communication access apparatus, comprising:
   a master shelf, comprising a master switching unit linked to communicate with a high-speed network;
   a plurality of slave shelves arranged in a given system topology with respect to the master shelf, each of the slave shelves comprising ports configured to serve network subscribers, and further comprising a slave switching unit, coupled to communicate with the master switching unit and to multiplex among the ports so as to provide the subscribers with access to the high-speed network, and to receive, from the master shelf, management messages that are addressed to an internal network-layer address that is determined uniquely for each of the slave shelves based on the topology; and
   a management station, coupled to convey the management messages to the master shelf over a management network in which at least some of the slave shelves share a common external network-layer address by mapping the internal network-layer address of each of the shelves to a respective transport-layer address, so as to perform configuration and maintenance functions on one or more of the slave shelves.

2. Apparatus according to claim 1, wherein the master shelf and the plurality of slave shelves belong to a Digital Subscriber Line Access Multiplexing (DSLAM) system.

3. Apparatus according to claim 1, wherein the high-speed network comprises an Asynchronous Transfer Mode (ATM) network.

4. Apparatus according to claim 3, wherein the master and slave switching units communicate over ATM lines.

5. Apparatus according to claim 4, wherein the management network comprises an Internet Protocol (IP) network, which is operative over the ATM lines using an IP over ATM protocol.

6. Apparatus according to claim 1, wherein the management network comprises an Internet Protocol (IP) network, and wherein the external network-layer address comprises an IP address.

7. Apparatus according to claim 6, wherein the external network-layer address comprises a single IP address that is common to the master shelf and to all of the slave shelves.

8. Apparatus according to claim 6, wherein the respective transport-layer address to which the management station maps the internal network-layer address comprises a session-layer port.

9. Apparatus according to claim 8, wherein the session-layer port comprises a User Datagram Protocol (UDP) port.

10. Apparatus according to claim 8, wherein the management station is further adapted to map each internal network-layer address of each of the shelves to multiple different session-layer ports, depending on a presentation-layer protocol used in the management messages.

11. Apparatus according to claim 8, wherein the internal network-layer address comprises an internal IP address, and wherein the master switching unit is adapted to map the session-layer port in the management messages to the internal IP address.

12. Apparatus according to claim 1, wherein the master switching unit is adapted to analyze the system topology and to assign the internal network-layer address of each of the slave shelves automatically responsive to the analyzed topology.

13. Apparatus according to claim 12, wherein the master switching unit is further adapted to determine the mapping of the internal network-layer address of each of the shelves to the respective transport-layer address automatically responsive to the analyzed topology.

14. Apparatus according to claim 1, wherein each of the slave shelves is adapted to determine its respective position in the topology and to recognize its internal network-layer address responsive to its determined position.

15. Apparatus according to claim 1, wherein the topology comprises a plurality of daisy chains, over which the slave switching units are coupled to communicate with the master switching unit.

16. Apparatus according to claim 15, wherein the internal network-layer address of each of the slave shelves is determined uniquely by an identifying number of the chain in which the shelf is located and a position of the shelf in the chain.

17. A method for providing communication access, comprising:
   linking a master switching unit on a master shelf to communicate with a high-speed network;
   arranging a plurality of slave shelves in a given system topology with respect to the master shelf, so that a slave switching unit on each slave shelf communicates with the master switching unit and multiplexes among subscriber ports on the slave shelf so as to provide the subscribers with access to the high-speed network;
   assigning to each slave shelf a unique internal network-layer address based on the topology, for receiving management instructions from the master switching unit;
   conveying the management instructions from a management station to the master shelf over a management network in which at least some of the slave shelves share a common external network-layer address, by mapping the internal network-layer address of each of the shelves to a respective transport-layer address, so as to perform configuration and maintenance functions on one or more of the slave shelves.

18. A method according to claim 17, wherein the master shelf and the plurality of slave shelves belong to a Digital Subscriber Line Access Multiplexing (DSLAM) system.

19. A method according to claim 17, wherein the high-speed network comprises an Asynchronous Transfer Mode (ATM) network.

20. A method according to claim 19, coupling the plurality of slave shelves comprises coupling the slave shelves to the master shelf over ATM lines.

21. A method according to claim 20, wherein the management network comprises an Internet Protocol (IP) network, and wherein coupling the management station to convey the management instructions comprises conveying the instructions over the ATM lines using an IP over ATM protocol.

22. A method according to claim 17, wherein the management network comprises an Internet Protocol (IP)

network, and wherein the external network-layer address comprises an IP address.

23. A method according to claim 22, wherein the external network-layer address comprises a single IP address that is common to the master shelf and to all of the slave shelves.

24. A method according to claim 17, wherein mapping the internal network-layer address comprises mapping the internal network-layer address to a session-layer port.

25. A method according to claim 24, wherein the session-layer port comprises a User Datagram Protocol (UDP) port.

26. A method according to claim 24, wherein mapping the internal network-layer address to the session-layer port comprises mapping the internal network-layer address to multiple different session-layer ports, depending on a presentation-layer protocol used in the management instructions.

27. A method according to claim 24, wherein the internal network-layer address comprises an internal IP address, and further comprising mapping the session-layer port in the management instructions received at the master shelf to the internal IP address of the slave shelf, and conveying the management instructions to the internal IP address.

28. A method according to claim 17, wherein assigning the unique internal network-layer address comprises automatically analyzing the system topology and assigning the internal network-layer address responsive to the analyzed topology.

29. A method according to claim 28, wherein conveying the management instructions comprises automatically determining the mapping of the internal network-layer address of each of the shelves to the respective transport-layer address responsive to the analyzed topology.

30. A method according to claim 17, wherein arranging the slave shelves in the topology comprises installing the shelves in a plurality of daisy chains, over which the slave switching units are coupled to communicate with the master switching unit.

31. A method according to claim 30, wherein assigning the internal network-layer address of each of the slave shelves comprises determining an identifying number of the chain in which the shelf is located and a position of the shelf in the chain, and assigning the internal network-layer address responsive to the determined number of the chain and the position of the shelf.

* * * * *